(12) United States Patent
Ma et al.

(10) Patent No.: US 11,969,986 B2
(45) Date of Patent: Apr. 30, 2024

(54) BIONIC LAMINATED THERMAL INSULATION MATERIAL

(71) Applicant: Zhengzhou University, Zhengzhou (CN)

(72) Inventors: Chengliang Ma, Zhengzhou (CN); Xiang Li, Zhengzhou (CN); Xiao Ma, Zhengzhou (CN); Shijie Wang, Zhengzhou (CN); Yiqiang Xing, Zhengzhou (CN); Haoran Du, Zhengzhou (CN); Qinguo Jin, Zhengzhou (CN); Huiyu Yuan, Zhengzhou (CN)

(73) Assignee: Zhengzhou University, Zhengzhou (CN)

( * ) Notice: Subject to any disclaimer, the term of this patent is extended or adjusted under 35 U.S.C. 154(b) by 320 days.

(21) Appl. No.: 17/478,119

(22) Filed: Sep. 17, 2021

(65) Prior Publication Data

US 2022/0089488 A1   Mar. 24, 2022

(30) Foreign Application Priority Data

Sep. 18, 2020 (CN) .......................... 202010982969.9

(51) Int. Cl.
*B32B 7/027* (2019.01)
*B32B 7/12* (2006.01)
(Continued)

(52) U.S. Cl.
CPC ............... *B32B 7/027* (2019.01); *B32B 7/12* (2013.01); *B32B 9/002* (2013.01); *B32B 37/12* (2013.01);
(Continued)

(58) Field of Classification Search
None
See application file for complete search history.

(56) References Cited

U.S. PATENT DOCUMENTS

| | | | | |
|---|---|---|---|---|
| 5,242,867 A | * | 9/1993 | Lin | ...................... H05K 1/0306 257/E23.009 |
| 2003/0166733 A1 | * | 9/2003 | Miyazaki | ........... A41D 13/0156 516/115 |
| 2013/0071640 A1 | * | 3/2013 | Szillat | ..................... B32B 5/022 427/430.1 |

FOREIGN PATENT DOCUMENTS

| | | |
|---|---|---|
| CN | 104153471 A | 11/2014 |
| CN | 204640963 U | 9/2015 |

(Continued)

OTHER PUBLICATIONS

Luan, H., Composite Thermal Insulation Board, Feb. 19, 2019, machine translation of CN109357107 (Year: 2019).*

(Continued)

*Primary Examiner* — Chinessa T. Golden
(74) *Attorney, Agent, or Firm* — DLA Piper LLP (US)

(57) ABSTRACT

The invention discloses a bionic laminated thermal insulation material, which imitates a multi-thin laminated and thin-layer micro-pore structure of Sequoia sempervirens bark with fire resistance, corrosion resistance and excellent thermal insulation performance. A low thermal conductivity microporous powder is used as main raw material, while reinforcing agent, plasticizer and porosity agent are added to form microporous thin-layer units, and each thin-layer unit is bonded and laminated to make a laminated thermal insulation material. The thermal conductivity of the finished products is as low as 0.02~0.05 W/m·k, with good thermal insulation and mechanical properties, which can be used in a temperature range below 1000° C., with better thermal insulation and energy-saving effect and toughness than ordinary thermal insulation materials, significantly reducing the thickness of the insulation layer, and can be widely used in industrial furnaces, thermal engineering devices, insulation pipes and other fields.

1 Claim, 1 Drawing Sheet

(51) Int. Cl.
*B32B 9/00* (2006.01)
*B32B 37/12* (2006.01)
*B32B 38/00* (2006.01)
*C04B 14/46* (2006.01)
*C04B 20/00* (2006.01)
*C04B 24/02* (2006.01)
*C04B 24/04* (2006.01)
*C04B 26/04* (2006.01)
*C04B 38/00* (2006.01)
*C04B 38/02* (2006.01)
*C04B 111/00* (2006.01)

(52) U.S. Cl.
CPC ........ *B32B 38/164* (2013.01); *C04B 14/4637* (2013.01); *C04B 14/4656* (2013.01); *C04B 20/008* (2013.01); *C04B 24/023* (2013.01); *C04B 24/045* (2013.01); *C04B 26/04* (2013.01); *C04B 38/0054* (2013.01); *C04B 38/02* (2013.01); *B32B 2264/1023* (2020.08); *B32B 2264/1024* (2020.08); *B32B 2264/1027* (2020.08); *B32B 2264/303* (2020.08); *B32B 2305/026* (2013.01); *B32B 2307/304* (2013.01); *C04B 2111/00612* (2013.01)

(56) References Cited

FOREIGN PATENT DOCUMENTS

| CN | 106631065 | A | * | 5/2017 | ................ B22F 7/04 |
| CN | 106631065 | A |   | 5/2017 | |
| CN | 109357107 | A | * | 2/2019 | ............ C04B 26/14 |
| CN | 109357107 | A |   | 2/2019 | |

OTHER PUBLICATIONS

Ma, C., Vacuum Insulation Refractory Product, May 10, 2017, machine translation of CN106631065 (Year: 2017).*

* cited by examiner

BIONIC LAMINATED THERMAL INSULATION MATERIAL

CROSS-REFERENCE TO RELATED APPLICATION

This application claims the benefit of Chinese Patent Application No. 202010982969.9, filed on Sep. 18, 2020 which is incorporated herein by reference.

TECHNICAL FIELD

The present invention discloses a bionic laminated thermal insulation material, which belongs to the technical field of refractory materials.

BACKGROUND

At present, with the rapid development of the economy, the energy supply situation is not optimistic. Among the most energy consumption is industrial energy consumption, which accounted for 73% of the total social energy consumption in 2015, and the proportion is increasing year by year. It is imperative to respond to the policy of saving energy and protecting the environment, and to reduce the loss of energy and resources in high-temperature industry and protect the environment. Therefore, it is important to develop new high temperature insulation materials to further save energy consumption for high energy consumption industries.

Traditional thermal insulation materials include lightweight thermal insulation bricks and refractory fiber products made from clay, corundum, mullite and other kinds of materials, which are commonly used in the thermal insulation of various industrial furnaces. With the development of society, people keep innovating in energy-saving materials and production process, and have successfully developed a variety of new thermal insulation materials, such as aerogel thermal insulation materials, microporous thermal insulation materials, etc., using new technology and new techniques to achieve high efficiency and energy saving. At the same time, industrial furnaces, thermal engineering devices, insulation pipes and other fields have put forward new demands for new thermal insulation materials in terms of thinness, longevity and environmental protection, and it is especially important to research and develop energy-efficient laminated thermal insulation materials.

China patent application 201410389034.4, titled "a composite laminated structure thermal insulation material with high thermal insulation efficiency", and China patent application 201520257206.2, titled "a laminated structure of thermal insulation material", each discloses a structure that is made from high reflectivity material aluminum film reflective layer and low thermal conductivity material alternately arranged and compounded. This kind of material effectively limits heat conduction, and can effectively reduce heat convection and heat radiation, so as to obtain high heat preservation effect, but the application filed of it is limited to refrigeration, building materials and other low temperature fields, and it cannot be used in high temperature conditions. China patent application ZL 20161204383.X, in the name of Ma et. al., discloses a vacuum thermal insulation refractory material product and its preparation method. The product is composed of core material and high barrier film wrapped outside the core material, and is prepared by vacuum hot pressing encapsulation into vacuum thermal insulation material. The product can be used under the temperature of 500~1200° C. and has low thermal conductivity and can maintain the vacuum structure, but the product is suffered from limitations in the preparation of the encapsulation material.

In order to prepare a new laminated thermal insulation material with better overall cost performance and environmental friendliness, the present invention proposes a new solution.

SUMMARY OF THE INVENTION

Natural organisms have evolved for billions of years and have the most reasonable and optimized macroscopic and microscopic composite perfect structure, and bionic material is a material with the structure and function of natural organisms by imitating the characteristics of natural organisms. The present invention is a new bionic laminated high-temperature thermal insulation material developed by imitating the structure of Sequoia sempervirens bark with excellent refractory and thermal insulation properties of multi-layered lamination and microporous thin layers, which is compounded by multi-layered units, significantly reduces the thermal conductivity and thickness of laminated thermal insulation material, increases its service life and applicability, and reduces its cost, and provides a new solution for the preparation of laminated thermal insulation material. It is a new solution for the preparation of laminated insulation materials.

To achieve the above object, the technical solution of the present invention is provided as described below.

The invention provides a bionic laminated thermal insulation material with the same structure as the multi-thin laminated, thin microporous layers of the bark of Sequoia sempervirens with excellent refractory and thermal insulation properties.

The thermal insulation material is made from low thermal conductivity microporous powder as main raw material into which reinforcing agent, plasticizer and porogenic agent are added, forming microporous thin-layer units, and the thin-layer units are bonded and laminated by adhesive to form laminated thermal insulation material.

Preferably, the thin layer unit consists of the following weight percentages: 70-93 wt % of low thermal conductivity microporous powder, 5-20 wt % of reinforcing agent, 1-5 wt % of plasticizer, and 1-5 wt % of porous agent.

Preferably, the low thermal conductivity microporous powder is a mixture of one or more of silica, alumina, titanium oxide and zirconia in the form of micro-scaled or nano-scaled porous powder material.

Preferably, the reinforcing agent is a blend of one or more of alumina silicate, high alumina, mullite, alumina and zirconia inorganic fibers.

Preferably, the plasticizer is a mixture of one or both of polyethylene glycol-400 (PEG-400) and Benzyl butyl phthalate (BBP).

Preferably, the porogenic agent is a mixture of one or more of ammonium bicarbonate, silicon carbide, starch and carbon powder.

Preferably, the binder is an inorganic high temperature binder mixed with one or both of silica sol and aluminum sol, or an organic non-toxic binder mixed with one or both of polyvinyl pyrrolidone and polyvinyl butyral ester.

Preferably, the thickness of the laminated insulation material is 40-50 mm and the thickness of the thin layer unit is 2-3 mm.

The above-mentioned bionic laminated insulation material is prepared by mixing low thermal conductivity microporous powder, reinforcing agent, plasticizer and porous agent in proportion to each other, forming a slurry and then preparing thin layer units, then bonding the thin layer units together with binder to obtain a blank, and finally drying the blank in a drying oven at 70-150° C. for 4-24 hours to obtain bionic laminated insulation material.

Compared with the prior art, the present invention has the following advantages.

1. The present invention takes Sequoia sempervirens bark as an imitation model, and prepares the thermal insulation material into a stable and reasonable bionic structure with multiple thin-layer lamination and thin-layer microporosity, which significantly reduces the heat conduction in the direction perpendicular to the hot surface, and the effective thermal conductivity is 0.02~0.05 W/m·k.
2. The thin-layer unit of the present invention adopts low thermal conductivity microporous powder as raw material, so that its thermal insulation performance is greatly improved, and refractory fiber is added at the same time, which not only makes the material have certain strength, but also reduces sintering shrinkage and has better high-temperature service performance when it is used. The laminated insulation material has certain toughness and bonding strength by bonding the laminate units together.
3. Replacement of aerogel with low thermal conductivity microporous powder, high temperature resistance, low cost, suitable for large-scale commercial production, easy to promote the application.

DETAILED DESCRIPTION OF EMBODIMENTS

Figure 1:
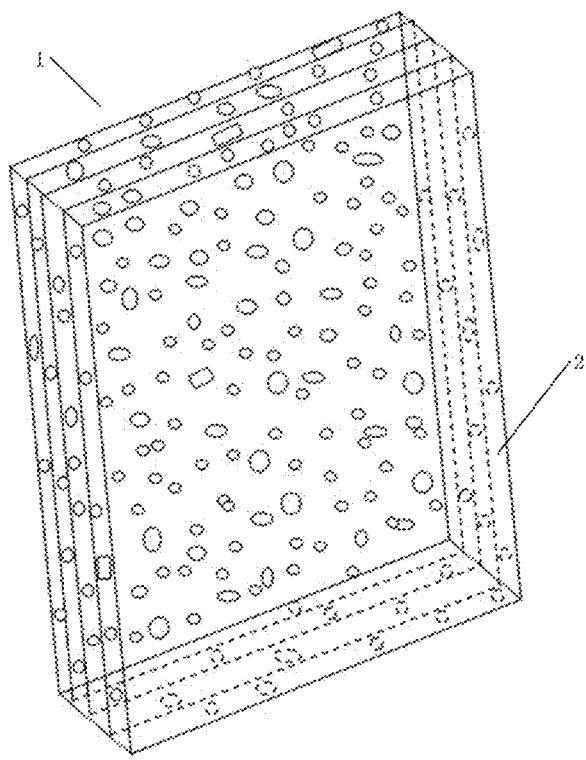
FIG. 1 is a schematic diagram of the structure of the bionic laminated thermal insulation material of the present invention; where 1 represents the bionic laminated insulation material and 2 represents a thin layer unit.
Figure 2:
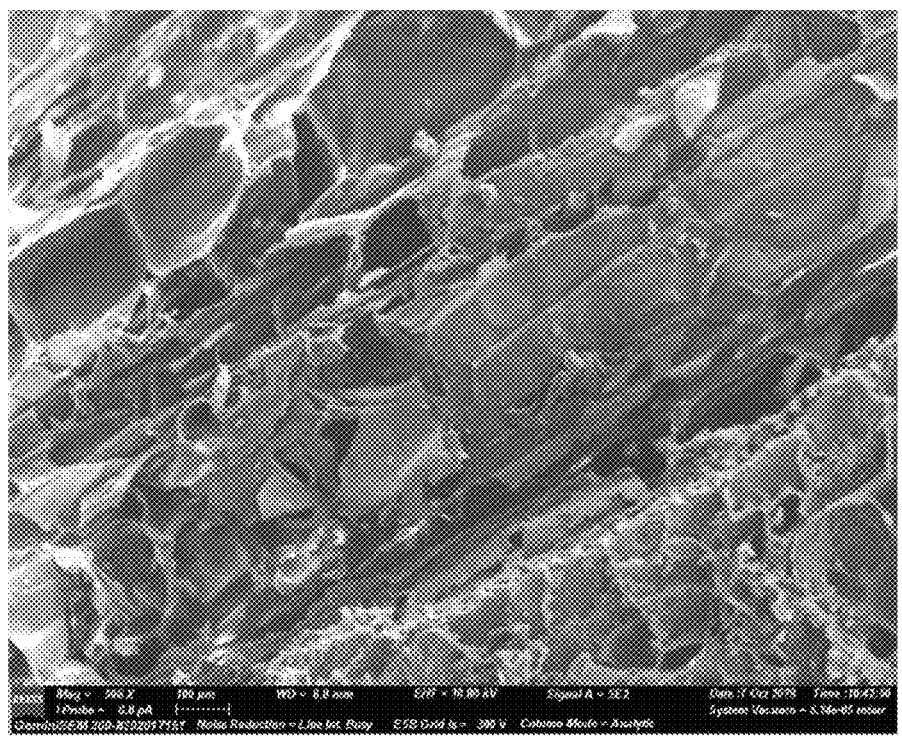
FIG. 2 is an SEM image of Sequoia sempervirens bark.

The technical solutions and effects of the present invention are further described below in conjunction with the accompanying drawings and specific embodiments, but the scope of protection of the present invention is not limited thereto.

Embodiment 1

The bionic laminated thermal insulation material of this embodiment is prepared by weighing alumina micro powder (86% by weight, particle size 0.03 mm), alumino silicate fiber (10% by weight), starch (1% by weight) and BBP (3% by weight), putting them all into a mixer, mixing them at 1000 r/min for 30 minutes, and fully mixing them to obtain a slurry with a certain viscosity. The mixed slurry was mixed at 1000 r/min for 30 minutes to obtain a slurry with a certain viscosity, and then the thin layer unit was prepared by spin coating method with a thickness of 2 mm.

The prepared thin-layer units were bonded together and a silicone adhesive was added between the units to produce the blanks. The resulting blanks were dried in a drying oven at 100° C. for 12 hours to obtain a bionic laminated insulation material 1 with a thickness of 40 mm and a laminate structure comprising 20 thin-layer units 2.

The resulting product was then tested for thermal conductivity and could be used in the temperature range up to 1000° C., with a thermal conductivity as low as 0.030 W/m·k at 500° C.

Embodiment 2

The bionic laminated thermal insulation material of this embodiment is prepared by weighing a mixture of fumed silica and alumina micronized powder (1:1 by weight, 88% by weight, 0.04 mm particle size), mullite fiber (9% by weight), silicon carbide (1% by weight) and PEG-400 (2% by weight), putting them all into a mixer, and then mixing them thoroughly for 30 minutes at 1000 r/min to obtain a slurry with a certain viscosity. The slurry was mixed at 1000 r/min for 30 minutes to obtain a certain viscosity, and then the mixed slurry was scraped to prepare thin-layer units with a thickness of 3 mm.

The prepared thin-layer units are bonded together, and polyvinylpyrrolidone binder is added between the units to produce the blanks. The resulting blanks were dried in a drying oven at 90° C. for 12 hours to obtain the bionic laminate insulation 1 with a thickness of 45 mm and a laminate structure consisting of 15 thin-layer units 2.

The resulting product was then tested for thermal conductivity and could be used in the temperature range up to 1000° C., with a thermal conductivity as low as 0.044 W/m·k at 500° C.

Embodiment 3

The bionic laminated thermal insulation material of this embodiment is prepared by weighing alumina micronized powder (90% by weight, particle size 0.03 mm), zirconia fiber (5% by weight), silicon carbide (1% by weight) and BBP (4% by weight), putting them all into a mixer, stirring them at 1000 r/min for 30 minutes, and fully mixing them to obtain a slurry with a certain viscosity. The mixed slurry was mixed at 1000 r/min for 30 minutes to obtain a certain viscosity, and then the thin layer unit was prepared by spin coating method with a thickness of 2 mm.

The prepared thin-layer units were bonded together and a silicone adhesive was added between the units to produce the blanks. The resulting blanks were dried in a drying oven at 150° C. for 12 hours to obtain the bionic laminate insulation 1 with a thickness of 40 mm and a laminate structure consisting of 20 thin-layer units 2.

The resulting product was then tested for thermal conductivity and could be used in the temperature range up to 1000° C., with a thermal conductivity as low as 0.034 W/m·k at 500° C.

Embodiment 4

The bionic laminated thermal insulation material of this embodiment is prepared by weighing alumina micro powder (90% by weight, particle size 0.02 mm), zirconia fiber (5% by weight), carbon powder (1% by weight) and BBP (4% by weight), putting them all into a mixer, stirring them at 1000 r/min for 30 minutes, and then fully The mixed slurry was mixed at 1000 r/min for 30 minutes to obtain a certain viscosity, and then the thin layer unit was prepared by spin coating method with a thickness of 2.5 mm.

The prepared thin-layer units were bonded together and a silicone adhesive was added between the units to produce the blanks. The resulting blanks were dried in a drying oven at 100° C. for 12 hours to obtain a bionic laminated insulation material 1 with a thickness of 45 mm and a laminate structure comprising 18 thin-layer units 2.

The resulting product was then tested for thermal conductivity and could be used in the temperature range up to 1000° C., with a thermal conductivity as low as 0.028 W/m·k at 500° C.

Embodiment 5

The bionic layered insulation material of this embodiment is prepared by weighing fumed silica (90% by weight, particle size 0.03 mm), zirconia fiber (5% by weight), silicon carbide (1% by weight) and PEG-400 (4% by weight), putting them all in a mixer, mixing them at 1000 r/min for 30 Then the mixed slurry was prepared by spin coating method with the thickness of 2.5 mm.

The prepared thin-layer units are bonded together and a silicone adhesive is added between the units to produce the blanks. The resulting blanks were dried in a drying oven at 100° C. for 12 hours to obtain a bionic laminated insulation material 1 with a thickness of 40 mm and a laminate structure comprising 16 thin-layer units 2.

The resulting product was then tested for thermal conductivity and could be used in the temperature range up to 1000° C., with a thermal conductivity as low as 0.021 W/m·k at 500° C., with excellent thermal insulation properties.

The inventor made a comparative measurement of the thermal conductivity of lightweight mullite thermal insulation brick (0.8 g/cm$^3$) at 500° C., which is 0.226 W/m-k, a difference of 10 times; if at the same temperature gradient, its thickness needs 175 mm, which is 4-5 times thicker than the thickness of the thermal insulation material of the present invention, which is prepared from low thermal conductivity microporous powder, reinforcing agent, plasticizer and porogenic agent to The bionic laminated thermal insulation material can significantly reduce the thermal conductivity of the material and improve the thermal insulation performance of the material.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

What is claimed is:

1. A bionic laminated thermal insulation material comprising laminated multiple thin layers, with micropores in the thin layers, to form a structure having excellent refractory and thermal insulation properties as the bark of *Sequoia sempervirens* and having a low thermal conductivity and a small thickness of laminated thermal insulation material;
   wherein the thermal insulation material is made from a low thermal conductivity microporous powder as main raw material, into which reinforcing agent, plasticizer and porosity agent are added to form microporous thin-layer units, and the thin-layer units are bonded and laminated by adhesive to form the laminated thermal insulation material;
   wherein each laminate unit consists of the following weight percentages: 70-93 wt % of low thermal conductivity microporous powder, 5-20 wt % of reinforcing agent, 1-5 wt % of plasticizer, and 1-5 wt % of porosity agent;
   wherein the low thermal conductivity microporous powder is a mixture of one or more of silica, alumina, titanium oxide and zirconium oxide in the form of micro-scaled or nano-scaled porous powder material;
   wherein the reinforcing agent is a blend of one or more of alumina silicate, high alumina, mullite, alumina and zirconia inorganic fibers;
   wherein the plasticiser is a mixture of one or both of PEG-400 and BBP;
   wherein the porosity agent is a mixture of one or more of ammonium bicarbonate, silicon carbide, starch and toner;
   wherein the adhesive is an inorganic high temperature binder mixed with one or both of silica sol and aluminum sol, or an organic non-toxic binder mixed with one or both of polyvinylpyrrolidone and polyvinyl butyral ester;
   wherein the laminated thermal insulation material has a thickness of 40-50 mm and a thermal conductivity of 0.02-0.05 W/m·k; and each thin layer unit has a thickness of 2-3 mm; and
   wherein the bionic laminated thermal insulation material is prepared by:
   mixing the low thermal conductivity microporous powder, the reinforcing agent, the plasticizer and the porosity agent in the above weight percentages to form a slurry;
   preparing thin-layer units from the slurry;
   bonding the thin-layer units by the adhesive to form a laminated blank; and
   drying the blank in a drying oven at 70-150° C. for 4-24 hours to obtain the bionic laminate insulation material.

* * * * *